(12) United States Patent
Nishigaki et al.

(10) Patent No.: US 8,601,863 B2
(45) Date of Patent: Dec. 10, 2013

(54) ABNORMALITY DETERMINATION APPARATUS AND ABNORMALITY DETERMINATION METHOD FOR MULTI-CYLINDER INTERNAL COMBUSTION ENGINE

(75) Inventors: Takahiro Nishigaki, Nagoya (JP); Keisuke Nagakura, Toyota (JP); Yusuke Fujitsu, Anjo (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 27 days.

(21) Appl. No.: 13/428,615

(22) Filed: Mar. 23, 2012

(65) Prior Publication Data
US 2012/0240669 A1  Sep. 27, 2012

(30) Foreign Application Priority Data
Mar. 25, 2011 (JP) .................. 2011-067918

(51) Int. Cl.
*G01M 15/00* (2006.01)

(52) U.S. Cl.
USPC ..................................................... 73/114.45

(58) Field of Classification Search
USPC ..................................................... 73/114.45
See application file for complete search history.

(56) References Cited

U.S. PATENT DOCUMENTS

| 6,591,817 | B2 * | 7/2003 | Deutsch .......................... 123/525 |
| 7,228,841 | B2 * | 6/2007 | Takemoto et al. ............. 123/304 |
| 8,118,006 | B2 * | 2/2012 | Pursifull ........................ 123/299 |
| 8,364,384 | B2 * | 1/2013 | Pursifull ........................ 701/104 |
| 2006/0101823 | A1 * | 5/2006 | Takemoto et al. .............. 60/716 |
| 2009/0043478 | A1 * | 2/2009 | Labonte ......................... 701/103 |
| 2011/0132321 | A1 * | 6/2011 | Pursifull ........................ 123/299 |

FOREIGN PATENT DOCUMENTS

| JP | 08-121237 A | 5/1996 |
| JP | 2010-024846 A | 2/2010 |
| JP | 2010-169038 A | 8/2010 |
| JP | 2010-223018 A | 10/2010 |

* cited by examiner

*Primary Examiner* — Freddie Kirkland, III
(74) *Attorney, Agent, or Firm* — Gifford, Krass, Sprinkle, Anderson & Citkowski, P.C.

(57) ABSTRACT

An abnormality determination apparatus for a multi-cylinder internal combustion engine equipped with a duel-injection system that has two fuel systems for injecting and supplying fuel to each of cylinders, which determines whether there is an abnormal variation in air-fuel ratio among the cylinders, includes: an abnormal variation determining unit that determines whether there is an abnormal variation in a period during which fuel is separately injected by both the two fuel systems; and an abnormality estimating unit that estimates which one of the fuel systems has an abnormality on the basis of a fuel injection distribution ratio of both the fuel systems in the period.

13 Claims, 3 Drawing Sheets

ABNORMALITY DETERMINATION APPARATUS AND ABNORMALITY DETERMINATION METHOD FOR MULTI-CYLINDER INTERNAL COMBUSTION ENGINE

CROSS REFERENCE TO RELATED APPLICATIONS

This application claims priority to Japanese Patent Application No. 2011-067918 filed on Mar. 25, 2011, which is incorporated herein by reference in its entirety including the specification, drawings and abstract.

BACKGROUND OF THE INVENTION

1. Field of the Invention

The invention relates to an abnormality determination apparatus and abnormality determination method for a multi-cylinder internal combustion engine equipped with a dual-injection system having two fuel systems for injecting and supplying fuel to each of cylinders and which determine an abnormal variation in air-fuel ratio among the cylinders.

2. Description of Related Art

In a multi-cylinder internal combustion engine, a variation in air-fuel ratio among cylinders may occur because of a variation in fuel injection amount among the injectors of the cylinders. When such a variation in air-fuel ratio among the cylinders occurs, there are the cylinders of which the air-fuel ratio is richer than the stoichiometric air-fuel ratio and the cylinders of which the air-fuel ratio is leaner than the stoichiometric air-fuel ratio even when the total air-fuel ratio of the internal combustion engine coincides with the stoichiometric air-fuel ratio.

When such a variation in air-fuel ratio among the cylinders occurs, the air-fuel ratio detected from the oxygen concentration of exhaust gas fluctuates, and the rate of change in air-fuel ratio increases. In addition, when a variation in air-fuel ratio occurs, a variation in generated torque among the cylinders occurs, and the amount of fluctuation in engine rotation speed increases. Therefore, it is possible to determine whether there is an abnormal variation on the basis of an accumulated value of the absolute value of the rate of change in air-fuel ratio or an accumulated value of the amount of fluctuation in engine rotation speed during a predetermined determination period.

Incidentally, in recent years, a multi-cylinder internal combustion engine equipped with a dual-injection system that includes two fuel systems for injecting and supplying fuel to each cylinder is practically used. A dual-injection system of this type includes a port injection fuel system that injects fuel into intake ports and a direct injection fuel system that directly injects fuel into cylinders. In the multi-cylinder internal combustion engine equipped with such a dual-injection system, a P injection mode in which only port injection is carried out, a D injection mode in which only direct injection is carried out and a PD injection mode in which both port injection and direct injection are carried out are used on the basis of an engine operating condition.

Then, the apparatus described in Japanese Patent Application Publication No. 2010-169038 (JP-A-2010-169038) has been suggested as an abnormality determination apparatus that determines whether there is an abnormal variation in air-fuel ratio among the cylinders of a multi-cylinder internal combustion engine equipped with a dual-injection system. The abnormality determination apparatus described in JP-A-2010-169038 separately accumulates a determination parameter for each injection mode and also makes an abnormality determination on the basis of the accumulated value for each injection mode.

The above abnormality determination apparatus estimates that there is an abnormality in the port injection fuel system when the accumulated value of the determination parameter for the P injection mode indicates an abnormal value, and estimates that there is an abnormality in the direct injection fuel system when the accumulated value of the determination parameter for the D injection mode indicates an abnormal value. Then, when any one of the fuel systems is estimated to have an abnormality, the injection mode is fixed in the mode in which only the fuel system estimated to have an abnormality is used and then an abnormality determination is made to thereby finally determine the fuel system that has an abnormality. Note that in such an existing abnormality determination apparatus for a multi-cylinder internal combustion engine, the accumulated value of the determination parameter for the PD injection mode is used only in order to insure the accuracy of the above estimation.

In the above technique, the fuel system that may have an abnormality cannot be identified unless the P injection mode and the D injection mode each are carried out for a set period of time or longer irrespective of whether they are intermittently carried out. However, depending on the operation of the multi-cylinder internal combustion engine, there may be a long time and many opportunities that the PD injection mode is carried out, and there may be limited time and opportunities that the P injection mode or the D injection mode is carried out. In such a case, with the above technique, it may take a great deal of time to make an abnormality determination.

Note that such a problem can also similarly occur in, for example, a system that includes a duel-injection system, other than a system that includes one of each of a port injection fuel system and a direct injection fuel system, such as a system that includes two direct injection fuel systems for each cylinder.

SUMMARY OF THE INVENTION

The invention provides an abnormality determination apparatus and abnormality determination method for a multi-cylinder internal combustion engine, which further early determine whether there is an abnormal variation in air-fuel ratio among cylinders of a multi-cylinder internal combustion engine equipped with a dual-injection system.

A first aspect of the invention is related to an abnormality determination apparatus for a multi-cylinder internal combustion engine equipped with a duel-injection system that has two fuel systems for injecting and supplying fuel to each of cylinders, which determines whether there is an abnormal variation in air-fuel ratio among the cylinders. The abnormality determination apparatus includes: an abnormal variation determining unit that determines whether there is an abnormal variation in a period during which fuel is separately injected by both the two fuel systems; and an abnormality estimating unit that estimates which one of the fuel systems has an abnormality on the basis of a fuel injection distribution ratio of both the fuel systems in the period.

In the above aspect, it is determined whether there is an abnormal variation in air-fuel ratio among the cylinders in a period during which fuel is separately injected from both the two fuel systems. In addition, with the above configuration, it is estimated which one of the fuel systems has an abnormality on the basis of the fuel injection distribution ratio of both the fuel systems in the period for the abnormality determination. Therefore, even when a time and an opportunity that a fuel injection mode using only any one of the fuel systems is carried out are limited, it is possible to make a determination as to whether there is an abnormal variation and estimate which one of the fuel systems has an abnormality. Thus, with the above configuration, it is possible to further early determine whether there is an abnormal variation in air-fuel ratio among the cylinders of the multi-cylinder internal combustion engine equipped with a dual-injection system.

When the fuel system estimated to have an abnormality is correct, a variation in air-fuel ratio among the cylinders increases when the fuel injection share of the fuel system estimated to have an abnormality is increased. Therefore, after the fuel injection share of the fuel system estimated to have an abnormality is increased, it is possible to check whether the estimation is correct on the basis of whether a variation in air-fuel ratio among the cylinders increases. Thus, after estimating fuel system that has an abnormality, the fuel injection share of the fuel system estimated to have an abnormality may be increased and then the secondary determination for finally determining whether the fuel system has an abnormality while the fuel injection share of the fuel system is being increased may be made. By so doing, it is possible to finally determine which one of the fuel systems has an abnormality.

Note that, in the above aspect, estimation of the fuel system that has an abnormality may be made by estimating the fuel system having a higher fuel injection distribution ratio in the period as the fuel system that has an abnormality.

In addition, a determination as to whether there is an abnormal variation may use an accumulated value of an amount of fluctuations in engine rotation speed among the cylinders or may use an accumulated value of an absolute value of a rate of change in air-fuel ratio among the cylinders.

A second aspect of the invention is related to an abnormality determination method for a multi-cylinder internal combustion engine equipped with a dual-injection system that has two fuel systems for injecting and supplying fuel to each of cylinders, which determines whether there is an abnormal variation in air-fuel ratio among the cylinders. The abnormality determination method includes: determining whether there is an abnormal variation in a period during which fuel is separately injected by both the two fuel systems; and estimating which one of the fuel systems has an abnormality on the basis of a fuel injection distribution ratio of both the fuel systems in the period.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
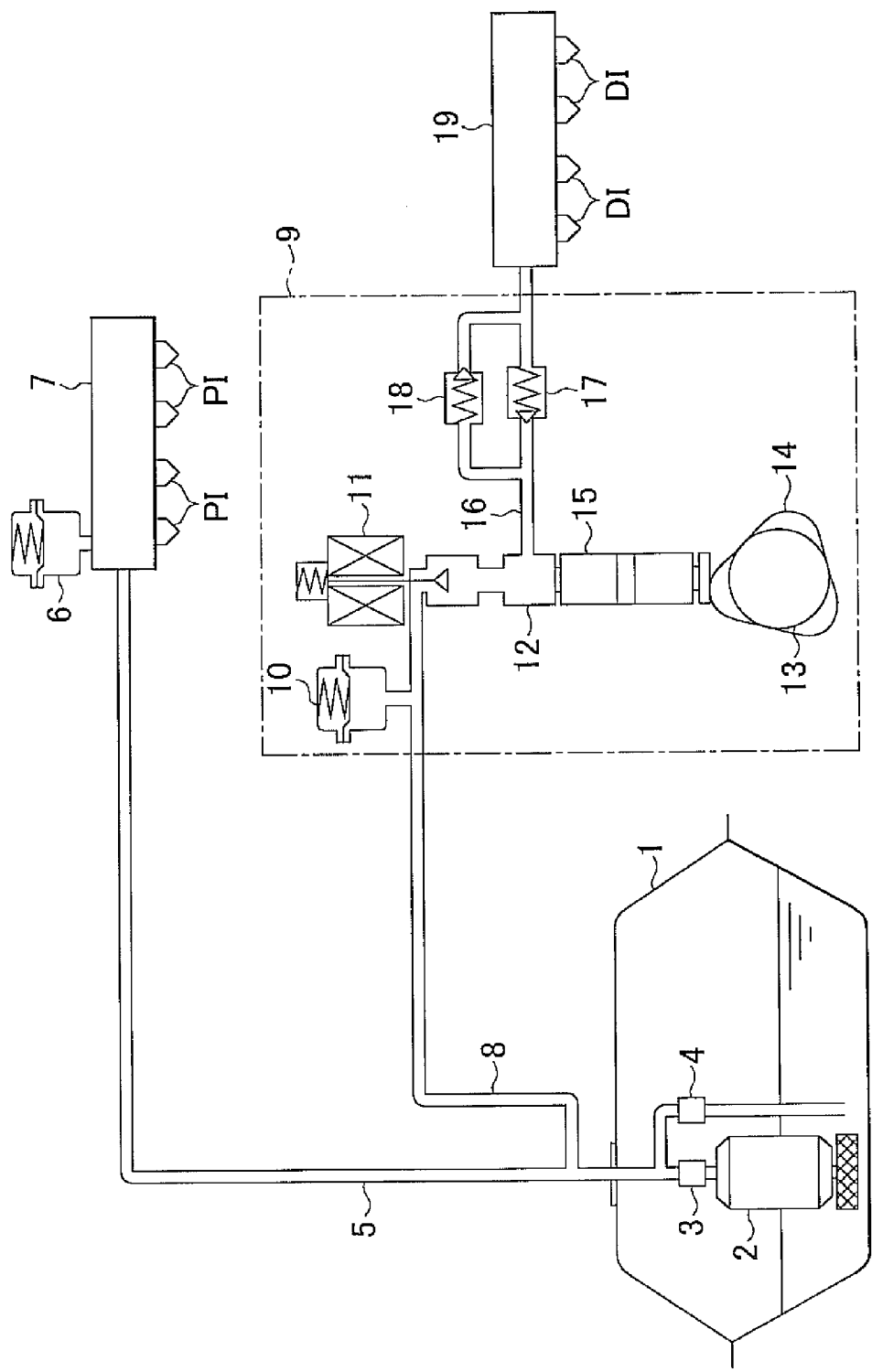
FIG. 1 is a schematic view that shows the configuration of fuel systems of a multi-cylinder internal combustion engine applied to an embodiment of the invention.
Figure 2:
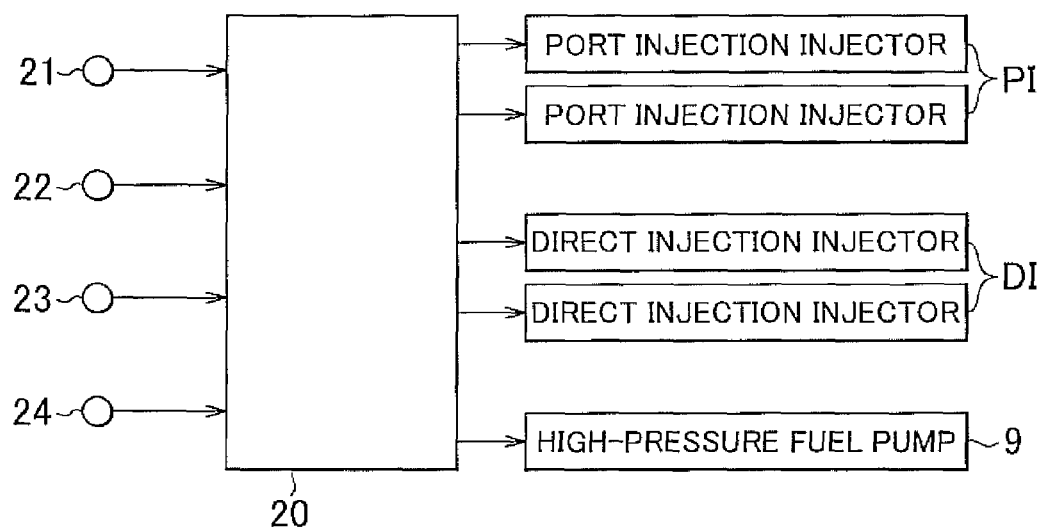
FIG. 2 is a schematic view that shows the configuration of a control system of the multi-cylinder internal combustion engine applied to the embodiment.

Hereinafter, a specific embodiment of an abnormality determination apparatus for a multi-cylinder internal combustion engine according to the aspect of the invention will be described in detail with reference to FIG. 1 to FIG. 3. Note that, in the present embodiment, the abnormality determination apparatus according to the aspect of the invention is applied to a multi-cylinder internal combustion engine that has in-line four cylinders.

First, the configuration of the fuel systems of the multi-cylinder internal combustion engine to which the present embodiment is applied will be described with reference to FIG. 1. As shown in the drawing, the discharge side of a feed pump 2 is connected to a low-pressure fuel passage 5 and a high-pressure fuel passage 8 via a fuel filter 3 and a pressure regulator 4. The feed pump 2 pumps fuel from a fuel tank 1. The fuel filter 3 purifies fuel. The pressure regulator 4 regulates the pressure of fuel. The low-pressure fuel passage 5 is connected to a low-pressure fuel pipe 7. A pulsation damper 6 is provided for the low-pressure fuel pipe 7. The pulsation damper 6 suppresses pulsation of fuel pressure. Port injection injectors PI are connected to the low-pressure fuel pipe 7. The port injection injectors PI are respectively provided in the intake ports of the cylinders.

On the other hand, the high-pressure fuel passage 8 is connected to a high-pressure fuel pump 9. The high-pressure fuel pump 9 is arranged in the cylinder head of the internal combustion engine. In the high-pressure fuel pump 9, the high-pressure fuel passage 8 passes through a pulsation damper 10 and is then connected to a pressurizing chamber 12 via an electromagnetic spill valve 11. The pulsation damper 10 suppresses pulsation of fuel pressure. A pump plunger 15 is arranged in the pressurizing chamber 12. The pump plunger 15 is displaced upward and downward by a cam 14 provided on a camshaft 13 of the multi-cylinder internal combustion engine.

A high-pressure fuel passage 16 is connected to the pressurizing chamber 12. High-pressure fuel discharged from the pressurizing chamber 12 passes through the high-pressure fuel passage 16. The high-pressure fuel passage 16 is connected to a high-pressure fuel pipe 19. The high-pressure fuel pipe 19 stores high-pressure fuel. In addition, a first check valve 17 and a second check valve 18 are arranged in the middle of the high-pressure fuel passage 16. The first check valve 17 prevents backflow of fuel. The second check valve 18 is used to return fuel to the high-pressure fuel pump 9 when the fuel pressure in the high-pressure fuel pipe 19 is excessively high. Note that direct injection injectors DI are connected to the high-pressure fuel pipe 19. The direct injection injectors DI are respectively provided for the cylinders.

Next, the operations of the thus configured fuel systems of the multi-cylinder internal combustion engine will be described. Fuel pumped by the feed pump 2 from the fuel tank 1 is purified by the fuel filter 3, the pumped fuel is regulated in pressure by the pressure regulator 4 and is then fed to the low-pressure fuel passage 5 and the high-pressure fuel passage 8. Fuel flowing into the low-pressure fuel passage 5 passes through the low-pressure fuel passage 5 and is fed to the low-pressure fuel pipe 7. Then, fuel fed to the low-pressure fuel pipe 7 is injected and supplied to the intake ports of the respective cylinders by the port injection injectors PI. Note that, in the present embodiment, the low-pressure fuel passage 5, the low-pressure fuel pipe 7, the port injection injectors PI, and the like, constitute the port injection fuel system.

On the other hand, fuel flowing into the high-pressure fuel passage 8 passes through the high-pressure fuel passage 8 and is fed to the high-pressure fuel pump 9. In the high-pressure fuel pump 9, the pump plunger 15 is displaced upward and downward by the cam 14, and the electromagnetic spill valve 11 is opened when the pump plunger 15 is displaced downward. Then, fuel flowing into the high-pressure fuel pump 9 is introduced into the pressurizing chamber 12 via the opened electromagnetic spill valve 11. As the electromagnetic spill valve 11 is closed while the pump plunger 15 is displaced upward, fuel in the pressurizing chamber 12 is pressurized with a reduction in the volume of the pressurizing chamber 12, and the pressurized fuel is discharged to the high-pressure fuel passage 16. Then, the fuel is fed to the high-pressure fuel pipe 19 via the high-pressure fuel passage 16, and is injected and supplied into the respective cylinders by the direct injection injectors DI. Note that, in the present embodiment, the high-pressure fuel pump 9, the high-pressure fuel passage 16, the high-pressure fuel pipe 19, the direct injection injectors DI, and the like, constitute the direct injection fuel system.

Next, the configuration of the control system of the multi-cylinder internal combustion engine that includes the thus configured fuel systems will be described with reference to FIG. 2. As shown in the drawing, the control system of the multi-cylinder internal combustion engine is mainly formed of an electronic control unit 20.

The electronic control unit 20 includes a central processing unit (CPU) and a read-only memory (ROM). The CPU executes various processings associated with engine control. The ROM stores programs and data for engine control. In addition, the electronic control unit 20 includes a random access memory (RAM) and input/output (I/O) ports. The RAM temporarily stores the processing results of the CPU, the detected results of sensors, and the like. The I/O ports mediates exchanges of signals with external devices.

Signals detected by the sensors provided at various portions of the engine are input to the input port of the electronic control unit 20. Those sensors include an air-fuel ratio sensor 21, a crank angle sensor 22, a coolant temperature sensor 23, an exhaust gas temperature sensor 24, and the like. The air-fuel ratio sensor 21 detects the air-fuel ratio of burned air-fuel mixture from the oxygen concentration of exhaust gas. The crank angle sensor 22 detects the rotation angle (crank angle) of a crankshaft that serves as an engine output shaft. The coolant temperature sensor 23 detects the engine coolant temperature. The exhaust gas temperature sensor 24 detects the temperature of exhaust gas. In addition, command signals are output from the output port of the electronic control unit 20 to the driving circuits of actuators, such as the port injection injectors PI, the direct injection injectors DI and the high-pressure fuel pump 9, provided at various portions of the engine.

In the thus configured present embodiment, the electronic control unit 20 determines whether there is an abnormal variation in air-fuel ratio among the cylinders during operation of the engine as part of engine control. Hereinafter, the details of a determination as to whether an abnormal variation in air-fuel ratio among the cylinders according to the present embodiment will be described.

First, in the present embodiment, the electronic control unit 20 accumulates the determination parameter in a period during which fuel is separately injected by both the two fuel systems, that is, port injection and direct injection. Then, the electronic control unit 20 determines whether there is an abnormal variation in air-fuel ratio among the cylinders on the basis of the accumulated value of the determination parameter.

Any parameter that increases with a variation in air-fuel ratio may be used as the determination parameter, and, for example, the amount of fluctuations in engine rotation speed among the cylinders, the absolute value of the rate of change in air-fuel ratio among the cylinders, or the like, may be used as the determination parameter. As a variation in air-fuel ratio among the cylinders occurs, a variation in generated torque among the cylinders occurs, and then the amount of fluctuations in engine rotation speed among the cylinders increases. Therefore, the amount of fluctuations in engine rotation speed among the cylinders may be used as a parameter based on which it is determined whether there is a variation in air-fuel ratio among the cylinders. In addition, as a variation in air-fuel ratio among the cylinders occurs, fluctuations in air-fuel ratio occur and then the absolute value of the rate of change in air-fuel ratio among the cylinders increases. Therefore, the absolute value of the rate of change in air-fuel ratio among the cylinders may also be used as a parameter based on which it is determined whether there is a variation in air-fuel ratio among the cylinders.

Note that the determination parameter is accumulated in a prescribed accumulation period (for example, during 100 cycles of the multi-cylinder internal combustion engine). In addition, at the same time with the accumulation, the distribution ratio of port injection and direct injection at that time is stored in the RAM of the electronic control unit 20. Then, it is determined whether there is an abnormal variation on the basis of whether the obtained accumulated value of the determination parameter is larger than or equal to a threshold calculated on the basis of the engine rotation speed, engine load and distribution ratio at that time.

When it is determined that there is an abnormal variation, it is estimated which one of the fuel systems has an abnormality on the basis of the fuel distribution ratio of both fuel systems in the accumulation period, stored in the RAM. In the present embodiment, the fuel system of which the fuel distribution ratio in the accumulation period of the determination parameter is higher is estimated as a fuel system that has an abnormality.

When the above estimation is made, a secondary determination for finally determining the fuel system that has an abnormality is subsequently made. The secondary determination is made as follows. The fuel injection share of the fuel system that is estimated to have an abnormality is increased to "100%", and the accumulated value of the determination parameter in a predetermined accumulation period is obtained. Note that, when a variation in air-fuel ratio due to a deviation in air-fuel ratio of a specific cylinder toward a lean side (lean imbalance) has been detected, the secondary determination is made in a no-load operation (idle operation). On the other hand, when a variation in air-fuel ratio due to a deviation in air-fuel ratio of a specific cylinder toward a rich side (rich imbalance) has been detected, the secondary determination is made in a load operation.

In the secondary determination as well, it is determined whether the fuel system estimated to have an abnormality on the basis of whether the accumulated value of the determination parameter in the accumulation period is larger than or equal to a threshold calculated on the basis of the engine rotation speed, engine load and distribution ratio at that time. Here, when it is determined that the fuel system estimated to have an abnormality has an abnormality, it is finally determined that the estimated fuel system has an abnormality. On the other hand, when it is determined that the fuel system estimated to have an abnormality does not have an abnormality, the fuel injection share of the fuel system different from the fuel system that is estimated to have an abnormality is increased to "100%" and then a similar abnormality determination is made. As a result, when it is determined that the fuel system different from the fuel system estimated to have an abnormality has an abnormality, it is finally determined that the fuel system different from the fuel system that is estimated to have an abnormality before has an abnormality.

Figure 3:
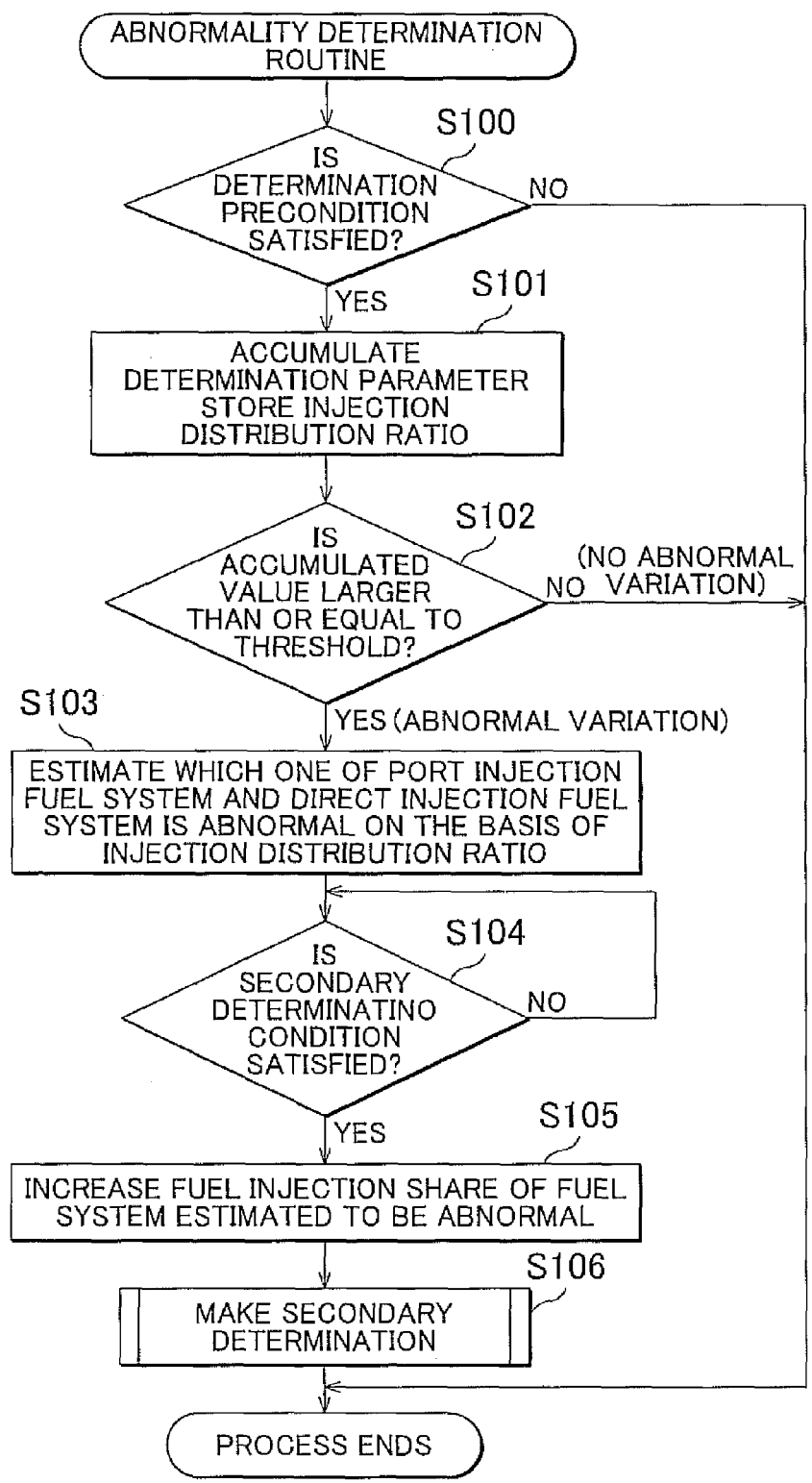
FIG. 3 is a flow chart that shows the procedure of abnormality determination routine applied to the embodiment.

FIG. 3 shows a flow chart of abnormality determination routine applied to the present embodiment. The process of the routine is periodically executed by the electronic control unit 20 during operation of the engine.

As the routine is started, first, it is determined in step S100 whether a determination precondition is satisfied. The determination precondition here includes a situation that warm-up of the multi-cylinder internal combustion engine is completed, a situation that the air-fuel ratio sensor 21 is activated, and the like. Here, when the determination precondition is not satisfied (NO in S100), the process of the current routine is ended directly.

On the other hand, when the determination precondition is satisfied (YES in S100), the process proceeds to step S101. In step S101, the determination parameter is accumulated during the predetermined accumulation period. In addition, at the same time, the fuel distribution ratio at that time is stored.

When accumulation of the determination parameter is completed, it is determined in step S102 whether the accumulated value of the determination parameter is larger than or equal to the threshold calculated on the basis of the engine rotation speed, the engine load and the distribution ratio. Here, when the accumulated value is smaller than the threshold and it is determined that there is no abnormal variation (NO in S102), the process of the current routine is ended directly. On the other hand, when the accumulated value is larger than or equal to the threshold and it is determined that there is an abnormal variation (YES in S102), the process proceeds to step S103.

When the process proceeds to step S103, it is estimated in step S103 which one of the port injection fuel system and the direct injection fuel system has an abnormality on the basis of the distribution ratio stored before. As described above, estimation at this time is made by estimating the fuel system of which the distribution ratio is higher as the fuel system that has an abnormality.

After that, after waiting that the condition that the secondary determination may be made is satisfied in step S104, the process proceeds to step S105. When the process proceeds to step S105, the fuel injection share of the fuel system that is estimated to have an abnormality is increased to "100%" in step S105. Then, in the next step S106, the secondary determination is made in the above described mode to finally determine the fuel system that has an abnormality.

With the abnormality determination apparatus for an internal combustion engine according to the present embodiment, the following advantageous effects may be obtained.

(1) In the present embodiment, a determination as to whether there is an abnormal variation is made in a period during which fuel is separately injected by both the port injection fuel system and the direct injection fuel system. Then, which one of the fuel systems has an abnormality is estimated on the basis of the fuel distribution ratio of both fuel systems in the above accumulation period. In the thus configured present embodiment, a determination as to whether an abnormal variation in air-fuel ratio among the cylinders and estimation of the abnormal fuel system are made in a period during which fuel is separately injected by both the two fuel systems. Therefore, even when a time and an opportunity that a fuel injection mode using only any one of the fuel systems is carried out are limited, it is possible to make a determination as to whether there is an abnormal variation and estimation of the fuel system that has an abnormality. Thus, according to the present embodiment, it is possible to further early determine whether there is an abnormal variation in air-fuel ratio among the cylinders of the multi-cylinder internal combustion engine equipped with the dual-injection system.

(2) In the present embodiment, after estimating an fuel system that has an abnormality, the fuel injection share of the fuel system that is estimated to have an abnormality is increased and then the secondary determination for finally determining the fuel system that has an abnormality in that state is made. When the above estimation of the fuel system that has an abnormality is correct, a variation in air-fuel ratio among the cylinders increases when the fuel injection share of the fuel system estimated to have an abnormality is increased. Therefore, after the fuel injection share of the fuel system estimated to have an abnormality is increased, it is possible to check whether the estimation is correct on the basis of whether a variation in air-fuel ratio among the cylinders increases. Therefore, it is possible to finally determine which one of the fuel system has an abnormality. In addition, the checking at this time is carried out in order from the fuel system that is highly likely to have an abnormality, so it is possible to suppress elongation of a determination period.

Note that the above described embodiment may be modified into the following alternative embodiments.

In the above described embodiment, the fuel injection share of the fuel system estimated to have an abnormality is set at "100%" in the second determination; instead, even when the fuel distribution share is not set at "100%", if only the fuel distribution share of the fuel system estimated to have an abnormality is increased, it is possible to finally determine the fuel system that has an abnormality. That is, when the fuel system of which the fuel injection share is increased actually has an abnormality, a variation in air-fuel ratio among the cylinders increases in response to the increase in the fuel injection share. On the other hand, when the fuel system of which the fuel injection share is increased actually does not have an abnormality, a variation in air-fuel ratio reduces in response to the increase in the fuel injection share. Thus, it is possible to finally determine whether the fuel system estimated to have an abnormality actually has an abnormality on the basis of whether the accumulated value of the determination parameter after increasing the fuel injection share increases as compared with that before the fuel injection share is increased.

In the above described embodiment, a determination as to whether an abnormal variation in air-fuel ratio among the cylinders is made using the accumulated value of the amount of fluctuations in engine rotation speed among the cylinders or the accumulated value of the absolute value of the rate of change in air-fuel ratio among the cylinders; however, such an abnormality determination may be made using a selected parameter as long as the parameter increases in response to a variation in air-fuel ratio among the cylinders.

In the above described embodiment, the aspect of the invention is applied to the multi-cylinder internal combustion engine having in-line four cylinders; instead, the aspect of the invention may also be similarly applied to a multi-cylinder internal combustion engine having another cylinder arrangement.

In the above described embodiment, the abnormality determination apparatus according to the aspect of the invention is applied to the multi-cylinder internal combustion engine equipped with the dual-injection system formed of the port injection fuel system and the direct injection fuel system. However, the aspect of the invention may also be similarly applied to a multi-cylinder internal combustion engine equipped with a dual-injection system having another configuration, such as a system formed of two direct injection fuel systems.

Note that, even when a time and an opportunity that only port injection or only direct injection is carried out are limited, it is possible to determine the fuel system that has an abnormality as follows. That is, when the fuel injection share of each fuel system is forcibly set at "100%" and then an abnormality determination is individually made for each of the fuel systems, it is possible to create an opportunity to make an abnormality determination for each fuel system.

What is claimed is:

1. An abnormality determination apparatus for a multi-cylinder internal combustion engine equipped with a dual injection system that has two fuel systems for injecting and supplying fuel to each of cylinders, which determines whether there is an abnormal variation in air-fuel ratio among the cylinders, the abnormality determination apparatus comprising:
    an abnormal variation determining unit that determines whether there is an abnormal variation during an abnormality determination period in which fuel is separately injected by both the two fuel systems into each of the cylinders; and
    an abnormality estimating unit that estimates which one of the fuel systems has an abnormality on the basis of a fuel injection distribution ratio of both the fuel systems in the abnormality determination period.

2. The abnormality determination apparatus according to claim 1, further comprising a secondary determination unit that, after the estimation is made by the abnormality estimating unit, increases a fuel injection share of the fuel system estimated to have an abnormality and then that makes a secondary determination for finally determining whether the fuel system has an abnormality while the fuel injection share of the fuel system is being increased.

3. The abnormality determination apparatus according to claim 2, wherein the secondary determining unit increases the fuel injection share of the fuel system estimated to have an abnormality to 100%.

4. The abnormality determination apparatus according to claim 2, wherein the secondary determining unit makes the secondary determination in a no-load operation when a variation in air-fuel ratio due to a deviation in air-fuel ratio of a specific cylinder toward a lean side has been detected, and the secondary determining unit makes the secondary determination in a load operation when a variation in air-fuel ratio due to a deviation in air-fuel ratio of a specific cylinder toward a rich side has been detected.

5. The abnormality determination apparatus according to claim 2, wherein the secondary determining unit determines whether the fuel system has an abnormality using an accumulated value of an amount of fluctuations in engine rotation speed among the cylinders.

6. The abnormality determination apparatus according to claim 2, wherein the secondary determining unit determines whether the fuel system has an abnormality using an accumulated value of an absolute value of a rate of change in air-fuel ratio among the cylinders.

7. The abnormality determination apparatus according to claim 2, wherein, when the secondary determining unit determines that the fuel system estimated to have an abnormality does not have an abnormality, the secondary determining unit makes the secondary determination by increasing a fuel injection share of the fuel system different from the fuel system estimated to have an abnormality.

8. The abnormality determination apparatus according to claim 1, wherein the abnormality estimating unit estimates the fuel system having a higher fuel injection distribution ratio among the two fuel systems in the abnormality determination period as the abnormal fuel system.

9. The abnormality determination apparatus according to claim 1, wherein the abnormal variation determining unit determines whether there is an abnormal variation using an accumulated value of an amount of fluctuations in engine rotation speed among the cylinders.

10. The abnormality determination apparatus according to claim 1, wherein the abnormal variation determining unit determines whether there is an abnormal variation using an accumulated value of an absolute value of a rate of change in air-fuel ratio among the cylinders.

11. The abnormality determination apparatus according to claim 1, wherein the two fuel systems are a port injection fuel system and a direct injection fuel system.

12. The abnormality determination apparatus according to claim 1, wherein the two fuel systems are direct injection fuel systems.

13. An abnormality determination method for a multi-cylinder internal combustion engine equipped with a dual injection system that has two fuel systems for injecting and supplying fuel to each of cylinders, which determines whether there is an abnormal variation in air-fuel ratio among the cylinders, the abnormality determination method comprising:
    determining whether there is an abnormal variation during an abnormality determination period in which fuel is separately injected by both the two fuel systems into each of the cylinders; and
    estimating which one of the fuel systems has an abnormality on the basis of a fuel injection distribution ratio of both the fuel systems in the abnormality determination period.

* * * * *